July 12, 1932. T. J. DINKINS 1,866,527
FLOORING
Filed Aug. 2, 1929 2 Sheets-Sheet 2

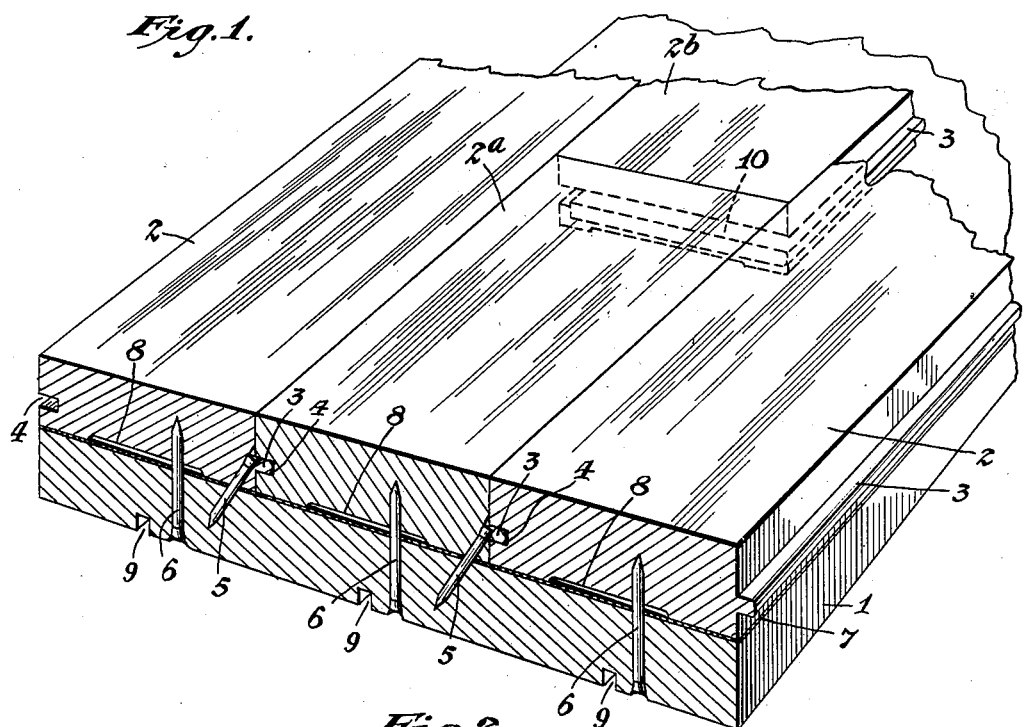
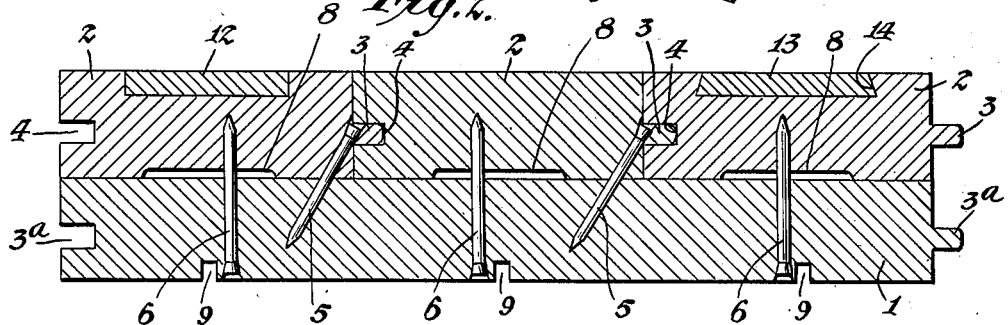
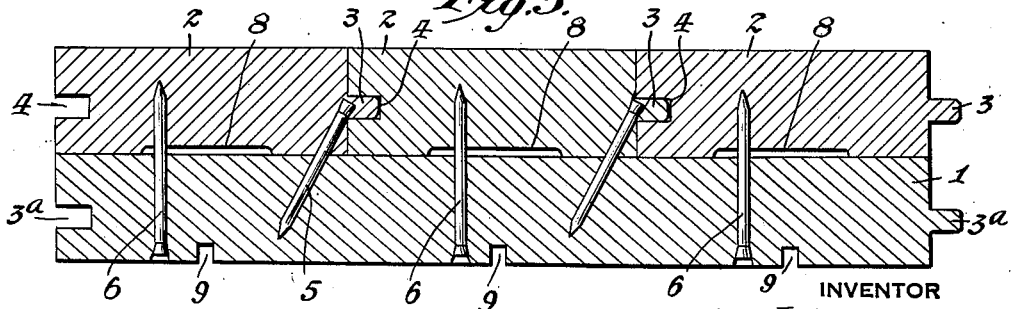

INVENTOR
Tyre J. Dinkins
BY
Frank J. Kent
ATTORNEY

Patented July 12, 1932

1,866,527

UNITED STATES PATENT OFFICE

TYRE J. DINKINS, OF MONTCLAIR, NEW JERSEY

FLOORING

Application filed August 2, 1929. Serial No. 382,933.

This invention relates to laminated or composite flooring, and its principal object is to provide composite floor boards or pieces in standard sizes, each of which includes a base corresponding to the main, base or rough flooring, and an upper or surface piece or structure corresponding to upper or surface flooring, so that a complete floor may be laid in one operation at greatly reduced labor cost and with increased speed and convenience.

Ordinarily, the main or rough flooring is laid and secured and then the surface flooring of high grade lumber is laid thereon. The individual pieces of the top flooring have to be cut to proper lengths and separately attached. By my invention, the complete flooring is provided in one piece of standard width and any of several standard lengths, and may be laid complete in one operation with no cutting except for length.

By this method or mode of construction, the surface flooring may be finished at the factory, cost of shipping and handling is greatly reduced as compared with the cost of handling separately the main and surface flooring; and various other advantages of the invention structures will be apparent from the following explanation.

The characteristics and advantages of the invention are further sufficiently explained in connection with the following detail description of the accompanying drawings, which shows representative embodiments. After considering these examples, skilled persons will understand that many variations may be made without departing from the principles disclosed, and I contemplate the employment of any structures that are properly within the scope of the appended claims.

Fig. 1 is a perspective and sectional view of a composite or laminated flooring structure embodying the invention in one form.

Fig. 2 is a transverse section of a modified form.

Fig. 3 is a similar view of another modification.

Figure 4:
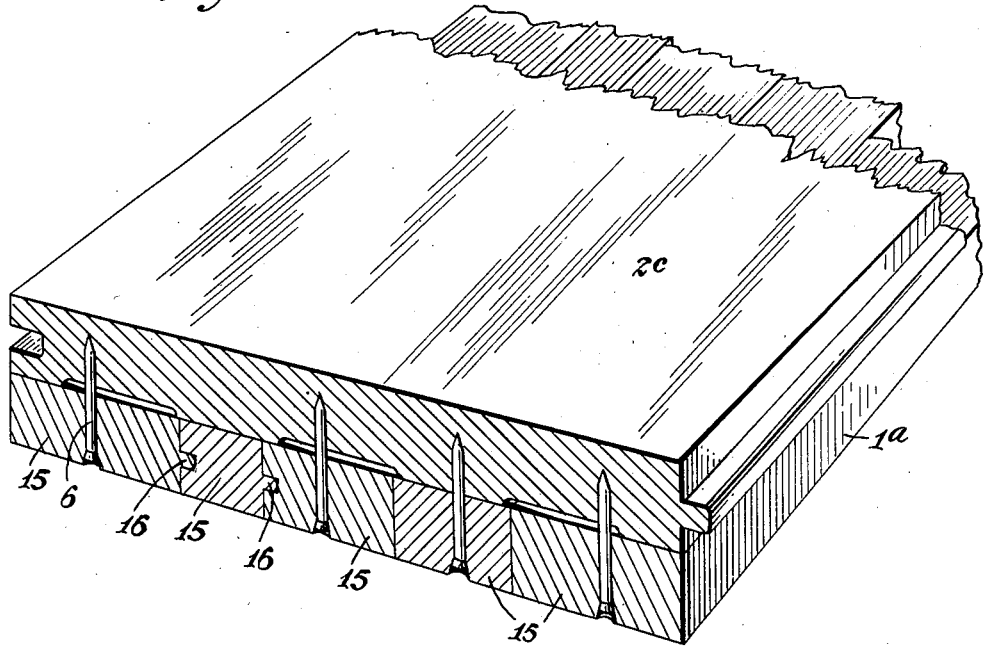
Fig. 4 is a perspective and sectional view of another modification.

In Fig. 1, the base or main floor portion of the composite flooring piece consists of a single board 1, and the upper or surface flooring consists of a plurality of strips 2 of suitable surfacing lumber. The complete composite board is made in standard widths, usually corresponding to the total width of the plurality of surfacing boards 2, which are themselves of any desired or standard widths. As to length, the composite board may be in standard lengths of say 8, 10, 12, 14 or 16 feet, so that cutting for length may be reduced to a minimum.

The surfacing boards may be connected or interfitted in any suitable or usual way, as by tongues 3 and grooves 4 (or otherwise as appears later). The surface boards are secured to the under or base board 1 in any suitable way, as by toe-nailing by nails or brads 5 driven through the bases of the tongues and angularly into the base board. The surface boards may be additionally secured by nails 6 driven up through the base board.

A layer of building paper 7 may be placed between the base and surface layers, for any of the usual purposes, or this may be omitted. The bottoms of the surface boards may be flat or, they may be of the form known as "hollow backed", that is provided with shallow channels 8 on their under surfaces to make a better fit or joint between the upper and lower boards, and if desired, the base board may have shallow ribs or "rises" (not shown) to fit into the channels 8, with or without building paper interposed between the layers.

The base board 1 may have grooves or channels 9 on its under surface to minimize or localize warping, etc. The base board 1, whether in one or more pieces, is usually of the full length of the composite board or strip; but the surface boards for the complete composite board may each be in one or more parts. Thus, I indicate the center strip in Fig. 1 as being composed of two or more pieces 2a and 2b, with their ends abutting and secured if desired, by tongue groove formations 10 on the ends.

Fig. 2 shows that the base board as well as the surface boards may have tongue and groove formations 3a and 3 respectively, for the interfitting of the several composite board sections. This figure also shows inlay strips 12 and 13 inserted in the upper surfaces of certain of the surface boards 2. The strip 12 is rectangular in section, and the strip 13 and its channel in the corresponding board 2 have dovetail formations 14. I may in this way provide various parquetry or inlay effects.

Figs. 2 and 3 show the building paper 7 of Fig. 1 omitted. Fig. 3 shows a structure similar to Fig. 2 with the omission of the inlay or parquetry strips 12, 13.

Fig. 4 shows that the main or base layer 1a may be composed of a plurality of separate strips or boards 15, which may have flat main faces or may be secured by any suitable edge formations such as the tongue and groove formations 16. In this example, the top or surface board 2c is in a single piece; that is, it extends the full width of the composite board, although it may be composed of two or more lengths with their ends abutting.

Figure 5:
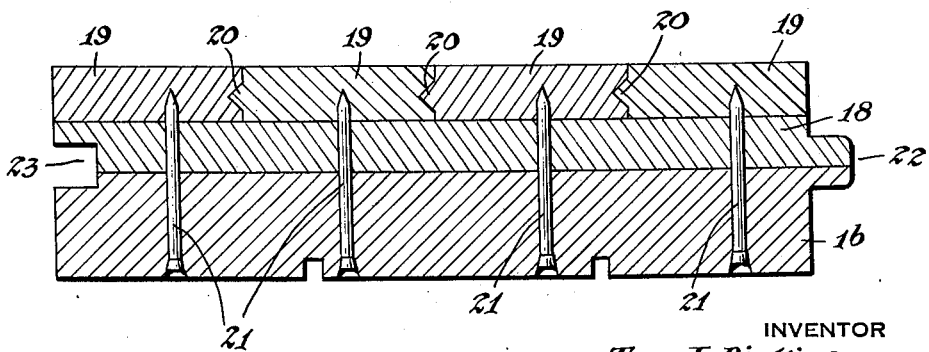
Fig. 5 is a transverse section of still another modification.

Fig. 5 shows a composite board including three layers; that is, the base board 1b, an intermediate board 18 which may be single or composite, and a surface layer composed of a plurality of strips 19, which are connected in this case by the tongues and grooves 20. All the parts are connected in this case by nails 21 driven up through the base board. In this instance, the tongues 22 and grooves 23 for interconnection of the different composite boards are formed partly in the base board and partly in the intermediate board 18.

The examples given make it clear that in the broader aspect, there is no limitation as to the mode of connecting the different layers or boards in any of the forms of the structure.

Among the main advantages of the structures disclosed are the following: The cost of time and labor in laying and finishing flooring is reduced to a very great extent, since the present composite boards eliminate the additional labor of laying a first or common floor as in ordinary practice, smoothing and finishing this common floor, preparing it for the finishing floor, and then the expense of separately laying the finishing floor, which is included in the laminated flooring. There is a saving probably equal to 50% in handling as compared with handling the two or more kinds or classes of pieces as required by ordinary methods. There is a great saving in labor time provided by furnishing composite flooring in standard long lengths, thus saving time of the mechanic in laying the surface flooring—cutting, fitting together, nailing, etc. The manufacturer may also, if desired, completely finish the flooring as by sand papering, painting or tinting or otherwise, so that the flooring is ready for use without subsequent finishing; also various uniform or variegated colors, and grain effects, may be produced at the factory without requiring attention of the workman to produce such effects in the laying of the floor. Other advantages of the invention will be apparent to skilled persons without further detailed explanation.

If desired, glue may be applied to any or all of the meeting surfaces or joints of the various structures to increase the security of connection of the parts.

I claim:

1. A composite floor board adapted to be laid as a unit, said board comprising a wide one piece base board, and a plurality of narrow surface boards secured to the top of the base board, the securing means including toe nailing through edges of the surface boards into the base board and nailing from the under side through the base board into the surface boards.

2. A composite floor board adapted to be laid as a unit, said board comprising a wide one piece base board, a plurality of narrow surface boards secured to the top of the base board, and building paper interposed between the base board and the surface boards, the securing means including toe nailing through edges of the surface boards into the base board and nailing from the under side through the base board into the surface boards.

3. A composite floor board adapted to be laid as a unit and having tongue and groove formations along its edges, said board comprising a wide base board, and a plurality of tongued and grooved narrow surface boards of indeterminate length fitted together and secured to the base board, the securing means including toe nailing through tongued edges of the surface boards into the base board and nailing from the under side through the base board into the surface boards.

4. A composite floor board adapted to be laid as a unit and having tongue and groove formations along its edges, said board comprising a wide base board, a plurality of tongued and grooved narrow surface boards of indeterminate length fitted together and secured to the base board, and building paper interposed between the base board and surface boards, the securing means including toe nailing through tongued edges of the surface boards into the base board and nailing from the under side through the base board into the surface boards.

5. A composite floor board adapted to be laid as a unit, said board comprising a wide one piece base board of standard length, and a plurality of tongued and grooved narrow surface boards of indeterminate length fitted together and secured to the base board longitudinally thereof, the securing means including toe nailing through tongued edges of the surface boards into the base board and nailing from the under side through the base board into the surface boards.

In testimony whereof I affix my signature.

TYRE J. DINKINS.